United States Patent [19]

Ono et al.

[11] Patent Number: 4,504,598
[45] Date of Patent: Mar. 12, 1985

[54] PROCESS FOR PRODUCING HONEYCOMB CATALYST FOR EXHAUST GAS CONVERSION

[75] Inventors: Tetsuji Ono, Amagasaki; Shoichi Ichihara, Toyonaka; Tomohisa Ohata, Suita; Sadao Terui, Osaka, all of Japan

[73] Assignee: Nippon Shokubai Kagaku Kogyo Co., Ltd., Osaka, Japan

[21] Appl. No.: 606,612

[22] Filed: May 3, 1984

[30] Foreign Application Priority Data

May 12, 1983 [JP] Japan ................................. 58-81650
Jun. 15, 1983 [JP] Japan ............................... 58-105738

[51] Int. Cl.³ ...................... B01J 21/04; B01J 21/06; B01J 23/10; B01J 23/89
[52] U.S. Cl. ................................... 502/303; 502/304; 423/213.5
[58] Field of Search .............................. 502/303, 304; 423/213.5

[56] References Cited

U.S. PATENT DOCUMENTS 4,294,726 10/1981 Bozon et al. ........................ 502/304
4,316,822 2/1982 Fujitani et al. ..................... 502/304
4,448,895 5/1984 Ono et al. ........................... 502/304

Primary Examiner—W. J. Shine
Attorney, Agent, or Firm—Sherman & Shalloway

[57] ABSTRACT

A process for producing a high-temperature resistant honeycomb catalyst, which comprises admixing cerium, zirconium, at least one metal selected from the group consisting of iron and nickel, at least one metal selected from the group consisting of platinum, palladium and rhodium, and optionally at least one metal selected from the group consisting of neodymium, lanthanum and praseodymium, each in the form of an aqueous solution or dispersion of a soluble or easily water-dispersible compound of the metal, with active alumina, drying the mixture, calcining it, dispersing the resulting catalyst composition in an aqueous medium, and depositing the dispersion on a monolithic honeycomb carrier. The resulting catalyst is useful for simultaneous conversion of hydrocarbons, carbon monoxide and nitrogen oxides in an exhaust gas.

3 Claims, No Drawings

PROCESS FOR PRODUCING HONEYCOMB CATALYST FOR EXHAUST GAS CONVERSION

This invention relates to a process for producing a honeycomb catalyst for cleaning an exhaust gas. Specifically, it relates to a process for producing a honeycomb catalyst for removing hydrocarbons (to be referred to as HC), carbon monoxide (to be referred to as CO) and nitrogen oxides (to be referred to as $NO_x$) which are noxious gases contained in an exhaust gas. More specifically, this invention relates to a process for producing a high-temperature durable monolithic honeycomb catalyst for cleaning an exhaust gas, which can simultaneously and stably render HC, CO and $NO_x$ in an exhaust gas substantially non-hazardous when an internal combustion engine is operated at an air-fuel ratio (to be referred to as an A/F ratio) near the stoichiometric point, and which undergoes little deterioration even when exposed to high temperatures of 800° C. or more.

There has been an increasing number of motor vehicles equipped with a catalyst for simultaneously removing HC, CO and $NO_x$ from an exhaust gas of an internal combustion engine by one catalytic converter, i.e. a so-called three-way catalyst, partly because of the need to reduce the fuel cost. In most cases, the catalyst is mounted below the vehicle under floor, and in some case, it is set immediately below the manifold of the engine.

An engine equipped with such a three-way catalytic converter discharges an exhaust gas in which the aforesaid three components are most effectively purified when it is operated at an A/F ratio close to the stoichiometrically equivalent point. To cause the three-way catalyst to act more effectively, a method is employed which involves using an electronically controlled fuel injection device for feeding the fuel at a constant A/F ratio by means of an injection pump or for controlling this ratio by using a venturi carburetor. However, with some controlling method, the catalyst might be exposed to an exhaust gas resulting from operation at an A/F ratio considerably deviated from the stoichiometrically equivalent point. Furthermore, when abrupt variations occur during operation by acceleration or deceleration, etc., the supply of the fuel will be cut partly or wholly in order to prevent melting of the honeycomb catalyst owing to an abrupt rise in temperature, and the catalyst may be exposed greatly to a lean A/F atmosphere.

The three-way catalyst is not always exposed to an exhaust gas generated as a result of operation at an ideal A/F ratio. When it is exposed to high temperatures, under the aforesaid non-ideal conditions, the ingredients, particularly rhodium and platinum, of the catalyst are susceptible to thermal degradation. It is therefore desired to provide a three-way catalyst which shows stable purifying properties and undergo little degradation even under such operating conditions where the A/F ratio varies over a wide range.

When the three-way catalyst is to be set in the vicinity of the vehicle's under floor, it is necessary to increase its performance by increasing the volume of the catalyst or the amount of the noble metals deposited because the temperature of that portion is lower than that of the vicinity of the engine. This leads to a higher cost.

If the three-way catalyst can be used at a high temperature immediately below the engine, the rate of the reaction is high and the volume of the catalyst can be made compact, thus leading to an economical advantage. Accordingly, it has been desired to develop a three-way catalyst which can be stably used at a temperature of 800° to 1,000° C. without degradation.

It is an object of this invention to provide a catalyst which has the ability to purify CO, HC and $NO_x$ stably in operation at a high temperature of at least 800° C. and a broad A/F ratio range.

A catalyst meeting this object cna be produced in accordance with this invention by admixing cerium, zirconium, at least one metal selected from the group consisting of iron and nickel, at least one metal selected from the group consisting of platinum, paladium, and rhodium, and optionally at least one metal selected from the group consisting of neodymium, lanthanum and praseodymium, each in the form of an aqueous solution or dispersion of a soluble or easily water-dispersible compound of the metal, with active alumina, drying the mixture, calcining it, dispersing the resulting catalyst composition in an aqueous medium, and depositing the resulting dispersion on a monlithic honeycomb carrier.

The monolithic honeycomb carrier used in this invention may be any of those which are normally called ceramic honeycomb carriers. Preferred honeycomb carriers are made of, for example, cordierite, mullite, α-alumina, zirconia, titania, titanium phosphate, aluminum titanate, petalite, spodumene, aluminosilicates, and magnesium silicate. A honeycomb carrier of cordierite is especially preferred for internal combustion engines. Monolithic honeycomb carriers produced from oxidation-resistant heat-resistant metals such as stainless steel and Fe-Cr-Al-Y alloy may also be used. These monolithic carriers are produced by an extrusion method, or a method involving wrapping and solidifying a sheet-like material. The shape of the gas passages of such carriers (the cell shape) may be various, for example hexagonal, tetragonal, triangular, or corrugated. The cell density (the number of cells/unit cross-sectional area) is usually 50 to 600 cells/inch$^2$.

Active alumina having a specific surface area of 50 to 180 m$^2$/g is preferred as the active alumina used in this invention. It is available in various crystal forms such as $\gamma$, $\delta$, $\theta$, $\chi$, $\kappa$, $\theta$, or $\eta$. Of these active alumina in $\gamma$ and $\delta$ crystal forms having a specific surface area of 70 to 160 m$^2$/g are especially preferred. The active alumina is deposited in an amount of 50 to 200 g per liter of the finished catalyst.

Cerium nitrate, cerium acetate, cerium oxalate, cerium carbonate, cerium hydroxide, cerium oxide, etc. are used preferably as a source of cerium.

Preferred as a source of zirconium are zirconyl nitrate, zirconyl acetate, zirconyl hydroxide, zirconium oxide, etc.

Preferred sources of iron include, for example, iron nitrate, iron hydroxide, iron oxide, iron acetate and iron ammonium oxalate.

Preferred as a source of nickel are nickel nitrate, nickel acetate, nickel carbonate, nickel hydroxide, nickel oxide, etc.

Preferred sources of neodymium, lanthanum and praseodymium include, for example, their nitrates, acetates, oxalates, carbonates, hydroxides and oxides.

The contents of cerium, zirconium and iron and/or nickel are: 5 to 30 g as $CeO_2$, 1 to 8 g as $ZrO_2$, and 0 to 10 g as $Fe_2O_3$, 0 to 10 g as NiO, respectively, (provided that $Fe_2O_3$+NiO=0.5 to 15 g per liter of the finished catalyst). Preferably, the content of $CeO_2$ is large than the total amount of $ZrO_2$, $Fe_2O_3$ and NiO.

The contents of neodymium, lanthanum and praseodymium as optional components may be 0 to 10 g per liter of the finished catalyst as $Nd_2O_3$, $La_2O_3$ and $Pr_6O_{11}$ respectively. Preferably, they are used in a total amount of 0 to 15 g.

Preferred sources of platinum, palladium and rhodium are, for example, their chlorides and nitrates. In the present invention, the use of at least one of these platinum-group metals is essential in order to obtain a catalyst having a high level of performance. The use of rhodium is especially effective, and rhodium is used preferably in combination with platinum and/or palladium. Preferably, an amount of 0.01-10 g of at least one metal of platinum, palladium and rhodium is used per liter of the catalyst.

The catalyst in accordance with this invention can be produced, for example, by the following methods. (1) and (2).

(1) A method which comprises admixing (a) cerium, (b) zirconium, (c) iron and/or nickel, (d) neodymium, lanthanium and/or praseodymium as an optional component, and (e) a platinum-group metal, each in the form of an aqueous solution or dispersion of a soluble or easily water-dispersible compound of the metal, with active alumina, drying the mixture, calcining it, dispersing the resulting catalyst composition in an aqueous medium, depositing the resulting slurry on a honeycomb carrier having a monolithic structure, and thereafter drying it or as required, calcining it, to form a finished catlayst.

(2) A method which comprises admixing (a) cerium, (b) zirconium, (c)iron and/or nickel, (d) neodymium, lanthanum and/or praseodymium as an optional component, each in the form of an aqueous solution or dispersion of a soluble or easily water dispersible compound of the metal, with active alumina, drying the mixture, calcining it, mixing the resulting product with an aqueous solution of a soluble salt of a platinum-group metal, drying the mixture, calcining it or reductively calcining it in a hydrogen-nitrogen atmosphere, dispersing the resulting catalyst composition in an aqueous medium, depositing the resulting slurry on a honeycomb carrier having a monolithic structure, and thereafter drying it, or as required, calcining it, to form a finished catalyst.

In these manufacturing methods, the drying is carried out at a temperature of not more than 200° C., preferably 100° to 180° C., and the calcination is carried out at 200° to 900° C., preferably 400° to 800° C.

In the finished catalysts obtained by the above methods in accordance with this invention, all the catalyst elements are uniformly dispersed in the honeycomb carrier, and in particular, the platinum-group metal is uniformly dispersed and deposited. Consequently, these finished catalysts exhibit very high activity during operation at a broad range of the A/F ratio and a very high activity to purify CO, HC and $NO_x$ during operation at an A/F ratio close to the stoichiometric point. Moreover, the degradation of these catalysts at high temperatures is very much reduced.

In contrast, in the case of a honeycomb catalyst produced by a conventional method, for example a finished catalyst obtained by a method which comprises first depositing alumina and then depositing a platinum-group metal, or a method which comprises a adding a water-soluble compound of a platinum-group metal to an aqueous slurry of alumina, the platinum-group metal may distribute in the surface layer of the catalyst deposited layer, or may move during the drying step, for example. Hence, the dispersion of the platinum-group metal in the finished catalyst cannot easily become uniform, and consequently such a finished catalyst is very susceptible to degradation when used at high temperatures.

The following examples illustrate the present invention more specifically.

EXAMPLE 1

A finished catalyst was prepared in the following manner by using a commercial cordierite honeycomb carrier (a product of NGK Insulators Ltd.). This honeycomb carrier was in the form of a cylinder having an outside diameter of 33 mm, a length of 76 mm and a volume of about 65 ml, and contained 300 gas-flowing cells per $inch^2$ of its cross section.

Cerium nitrate $[Ce(NO_3)_3.6H_2O]$ (106.7 g), 41.7 g of zirconyl nitrate $[ZrO(NO_3)_2.2H_2O]$, 38.9 g of ferric nitrate $[Fe(NO_3)_3.9H_2O]$, 10.52 g of palladium chloride $[PdCl_2.2H_2O]$ and 1.34 g of rhodium chloride $[RhCl_3.3H_2O]$ were dissolved in 450 g of pure water. The aqueous solution was fully mixed with 500 g of active alumina having a specific surface area of 100 $m^2/g$. The mixture was dried at 130° C. for 3 hours, and then calcined at 600° C. for 2 hours.

The resulting alumina containing the catalyst ingredients was dispersed in water to prepare a slurry. The honeycomb carrier was immersed for 1 minute in the slurry, and then withdrawn from it. The excess of the slurry within the cells was blown off with compressed air, and then the product was dried at 130° C. for 3 hours to obtain a finished catalyst.

The finished catalyst was found to have deposited therein per liter 130 g of $Al_2O_3$, 11 g of $CeO_2$, 25 g of $ZrO_2$, 2 g of $Fe_2O_3$, 1.364 g of Pd and 0.136 g of Rh.

EXAMPLES 2 TO 4

In each run, a finished catalyst was prepared in the same way as in Example 1 except that the catalyst composition was varied as shown in Table 1.

TABLE 1

| | Amount deposited per liter of the finished catalyst (g/liter) | | | | | |
|---|---|---|---|---|---|---|
| Example | $Al_2O_3$ | $CeO_2$ | $ZrO_2$ | $Fe_2O_3$ | Pd | Rh |
| 1 | 130 | 11 | 5 | 2 | 1.364 | 0.136 |
| 2 | 130 | 20 | 4 | 3 | 1.364 | 0.136 |
| 3 | 160 | 13 | 5 | 2 | 1.364 | 0.136 |
| 4 | 90 | 8 | 3 | 1 | 1.364 | 0.136 |

EXAMPLE 5

A finished catalyst was prepared as in Example 1 using neodymium nitrate $[Nd(NO_3)_3.6H_2O]$ additionally.

Specifically, 157.6 g of cerium nitrate, 18.1 g of zirconyl nitrate, 84.3 g of ferric nitrate, 54.3 g of neodymium nitrate, 11.40 g of palladium chloride and 1.45 g of rhodium chloride were dissolved in 450 g of pure water. The aqueous solution was mixed with 500 g of active alumina. The mixture was dried at 130° C. for 3 hours and calcined at 600° C. for 2 hours. A finished catalyst was obtained by the same technique as in Example 1 using the resulting alumina containing the catalyst ingredients.

The finished catalyst was found to have deposited therein per liter 120 g of $Al_2O_3$, 15 g of $CeO_2$, 2 g of $ZrO_2$, 4 g of $Fe_2O_3$, 5 g of $Nd_2O_3$, 1.364 g of Pd and 0.135 g of Rh.

EXAMPLE 6

A finished catalyst was prepared as in Example 5 except that lanthanum nitrate [$La(NO_3)_3.6H_2O$] was used instead of neodymium nitrate.

The finished catalyst was found to have deposited therein per liter 120 g of $Al_2O_3$, 15 g of $CeO_2$, 2 g of $ZrO_2$, 4 g of $Fe_2O_3$, 5 g of $La_2O_3$, 1.364 g of Pd and 0.136 g of Rh.

EXAMPLE 7

A finished catalyst was prepared as in Example 5 except that praseodymium nitrate [$Pr(NO_3)_3.6H_2O$] was used instead of neodymium nitrate.

The finished catalyst was found to have deposited therein per liter 120 g of $Al_2O_3$, 15 g of $CeO_2$, 2 g of $ZrO_2$, 4 g of $Fe_2O_3$, 5 g of $Pr_6O_{11}$, 1.364 g of Pd and 0.136 g of Rh.

EXAMPLE 8

A finished catalyst was prepared by the same technique as in Example 1 except that nickel nitrate [$Ni(NO_3).6H_2O$] was used additionally.

Cerium nitrate (106.7 g), 41.7 g of zirconyl nitrate, 38.9 g of ferric nitrate, 36.3 g of nickel nitrate, 10.52 g of palladium chloride and 1.34 g of rhodium chloride were dissolved in 450 g of pure water. The aqueous solution was fully mixed with 500 g of active alumina, and the mixture was dried at 130° C. for 3 hours and then calcined at 600° C. for 2 hours. Using the resulting alumina containing the catalyst ingredients, a finished catalyst was prepared in the same way as in Example 1.

The finished catalyst was found to have deposited therein per liter 130 g of $Al_2O_3$, 11 g of $CeO_2$, 5 g of $ZrO_2$, 2 g of $Fe_2O_3$, 2 g of NiO, 1.364 g of Pd and 0.136 g of Rh.

EXAMPLE 9

A finished catalyst was prepared in the same way as in Example 1 except that an aqueous solution of zirconyl acetate (Zr 200 g/liter) was used as a material for zirconium and, ferric acetate [$Fe(CH_3COO)_3.4H_2O$], as a material for iron.

EXAMPLE 10

A finished catalyst was prepared in the same way as in Example 1 except that cerium acetate [$Ce(CH_3COO)_3$] was used as a material for cerium.

EXAMPLE 11

A finished catalyst was prepared as in Example 1 using ferric oxide ($Fe_2O_3$) as the iron source instead of ferric nitrate.

Specifically, 106.7 g of cerium nitrate, 41.7 g of zirconyl nitrate, 8.90 g of palladium chloride and 3.41 g of rhodium chloride were dissolved in 450 g of pure water. The aqueous solution was fully mixed with 7.7 g of ferric oxide and 500 g of active alumina. The mixture was dried at 130° C. for 3 hours, and then calcined at 600° C. for 2 hours. Using the resulting alumina containing the catalyst ingredients. a finished catalyst was prepared in the same way as in Example 1.

The finished catalyst was found to have deposited therein per liter 130 g of $Al_2O_3$, 11 g of $CeO_2$, 5 g of $ZrO_2$, 2 g of $Fe_2O_3$, 1.364 g of Pd and 0.136 g of Rh.

EXAMPLE 12

A finished catalyst was prepared in the same way as in Example 1 except that an aqueous nitric acid solution of palladium nitrate (concentration Pd 100 g/liter) was used as a material for palladium, and rhodium nitrate [$Rh(NO_3)_3.2H_2O$], as a material for rhodium.

EXAMPLE 13

Cerium nitrate (106.7 g), 41.7 g of zirconyl nitrate, 38.9 g of ferric nitrate, 13.93 g of chloroplatinic acid [$H_2PtCl_6.6H_2O$] and 1.34 g of rhodium chloride were dissolved in 450 g of pure water. The aqueous solution was fully mixed with 500 g of active alumina. The mixture was dried at 130° C. for 3 hours, and calcined at 600° C. for 2 hours. Using the resulting alumina containing the catalyst ingredients, a finished catalyst was prepared by the same technique as in Example 1.

The finished catalyst was found to have deposited therein per liter 130 g of $Al_2O_3$, 11 g of $CeO_2$, 5 g of $ZrO_2$, 2 g of $Fe_2O_3$, 1.364 g of Pt and 0.136 g of Rh.

EXAMPLES 14 and 15

Catalysts were prepared by the same technique as in Example 13 except that the compositions of the catalysts were changed as shown in Table 2.

EXAMPLE 16

A finished catalyst was prepared by the same technique as in Example 1 except that alumina containing catalyst ingredients was prepared as shown below.

Cerium nitrate (106.7 g), 41.7 g of zirconyl nitrate and 38.9 g of ferric nitrate were dissolved in 450 g of pure water. The aqueous solution was fully mixed with 500 g of active alumina. The mixture was dried at 130° C. for 3 hours and then calcined at 700° C. for 2 hours. The resulting alumina containing Ce, Zr and Fe was fully mixed with an aqueous solution of 10.52 g of palladium chloride and 1.34 g of rhodium chloride in 450 g of pure water. The mixture was dried at 130° C. for 3 hours and calcined at 600° C. for 2 hours.

Using the resulting alumina containing the catalyst ingredients, a finished catalyst was prepared by the same technique as in Example 1.

The finished catalyst was found to have deposited therein per liter 130 g of $Al_2O_3$, 11 g of $CeO_2$, 5 g of $ZrO_2$, 2 g of $Fe_2O_3$, 1.364 g of Pd and 0.136 g of Rh.

TABLE 2

| | Amount deposited per liter of the finished catalyst (g/liter) | | | | | | | |
|---|---|---|---|---|---|---|---|---|
| Example | $Al_2O_3$ | $CeO_2$ | $ZrO_2$ | $Fe_2O_3$ | Others | | Pd | Pt | Rh |
| 5 | 120 | 15 | 2 | 4 | $Nd_2O_3$ 5 g | 1.364 | — | 0.136 |
| 6 | 120 | 15 | 2 | 4 | $La_2O_3$ 5 g | 1.364 | — | 0.136 |
| 7 | 120 | 15 | 2 | 4 | $Pr_6O_{11}$ 5 g | 1.364 | — | 0.136 |
| 8 | 130 | 11 | 5 | 2 | NiO 2 g | 1.364 | — | 0.136 |
| 9 | 130 | 11 | 5 | 2 | — | 1.364 | — | 0.136 |
| 10 | 130 | 11 | 5 | 2 | — | 1.364 | — | 0.136 |
| 11 | 130 | 11 | 5 | 2 | — | 1.364 | — | 0.136 |

TABLE 2-continued

| | Amount deposited per liter of the finished catalyst (g/liter) | | | | | | | |
|---|---|---|---|---|---|---|---|---|
| Example | Al$_2$O$_3$ | CeO$_2$ | ZrO$_2$ | Fe$_2$O$_3$ | Others | | Pd | Pt | Rh |
| 12 | 130 | 11 | 5 | 2 | — | | 1.364 | — | 0.136 |
| 13 | 130 | 11 | 5 | 2 | — | | — | 1.364 | 0.136 |
| 14 | 130 | 20 | 4 | 3 | — | | — | 1.364 | 0.136 |
| 15 | 120 | 15 | 2 | 4 | Nd$_2$O$_3$ | 5 g | — | 1.364 | 0.136 |
| 16 | 130 | 11 | 5 | 2 | — | | 1.364 | | 0.136 |

COMPARATIVE EXAMPLE 1

A finished catalyst was prepared by using the same commercial cordierite carrier as in Example 1.

The honeycomb carrier was immersed for 1 minute in a slurry prepared by dispersing active alumina in an aqueous medium. The carrier was then withdrawn from the slurry, and the excess of the slurry in the cells was blown off with compressed air. The carrier was then dried at 130° C. for 3 hours and then calcined at 700° C. for 2 hours. The amount of alumina supported was 130 g per liter of the catalyst.

The alumina-coated carrier was then immersed in a mixed aqueous solution of cerium nitrate, zirconyl nitrate and ferric nitrate, dried at 130° C. for 3 hours and calcined at 600° C. for 2 hours.

The treated carrier was then immersed in an aqueous solution of palladium chloride, dried at 130° C. for 3 hours, and calcined at 500° C. for 2 hours. Then, the calcined product was immersed in an aqueous solution of rhodium chloride, dried at 130° C. for 3 hours, and calcined at 500° C. for 2 hours.

The finished catalyst was found to have deposited therein per liter 130 g of Al$_2$O$_3$, 11 g of CeO$_2$, 5 g of ZrO$_2$, 2 g of Fe$_2$O$_3$, 1.364 g of Pd and 0.136 g of Rh.

COMPARATIVE EXAMPLE 2

A finished catalyst was prepared by using the same commercial cordierite carrier as in Example 1.

Cerium nitrate (194.0 g), 33.4 g of zirconyl nitrate and 58.4 g of ferric nitrate were dissolved in 450 g of pure water. The aqueous solution was fully mixed with 500 g of active alumina. The mixture was dried at 130° C. for 3 hours, and calcined at 600° C. for 2 hours. The resulting alumina containing Ce, Zr and Fe was mixed with an aqueous medium to form a slurry. The honeycomb carrier was immersed for 1 minute in the slurry and then withdrawn from it. The excess of the slurry in the cells was blown off with compressed air. Then, the treated carrier was dried at 130° C. for 3 hours and calcined at 700° C. for 1 hour.

The resulting alumina-coated carrier containing Ce, Zr and Fe was immersed in an aqueous solution of palladium chloride, dried at 130° C. for 3 hours, and calcined at 500° C. for 2 hours. Then the calcined product was immersed in an aqueous solution of rhodium chloride, dried at 130° C. for 3 hours and calcined at 500° C. for 2 hours.

The finished catalyst was found to have deposited therein per liter 130 g of Al$_2$O$_3$, 20 g of CeO$_2$, 4 g of ZrO$_2$, 3 g of Fe$_2$O$_3$, 1.364 g of Pd and 0.136 g of Rh.

COMPARATIVE EXAMPLES 3 TO 5

Finished catalysts were prepared by the same technique as in Comparative Example 2 except that the compositions of the catalysts were changed as shown in Table 3.

TABLE 3

| | Amount deposited per liter of the finished catalyst (g/liter) | | | | | | |
|---|---|---|---|---|---|---|---|
| Comparative Example | Al$_2$O$_3$ | CeO$_2$ | ZrO$_2$ | Fe$_2$O$_3$ | Others | Pd | Rh |
| 1 | 130 | 11 | 5 | 2 | — | 1.364 | 0.136 |
| 2 | 130 | 20 | 4 | 3 | — | 1.364 | 0.136 |
| 3 | 130 | 11 | — | 2 | — | 1.364 | 0.136 |
| 4 | 130 | 11 | 6 | — | — | 1.364 | 0.136 |
| 5 | 120 | 10 | — | — | Nd$_2$O$_3$ (10) | 1.364 | 0.136 |

COMPARATIVE EXAMPLE 6

A finished catalyst was prepared by the same technique as in Comparative Example 1 except that the composition of the catalyst was changed as shown in Table 4.

TABLE 4

| Amount deposited per liter of the finished catalyst (g/liter) | | | | | |
|---|---|---|---|---|---|
| Al$_2$O$_3$ | CeO$_2$ | ZrO$_2$ | Fe$_2$O$_3$ | Pt | Rh |
| 100 | 4 | 5 | 4 | 1.364 | 0.136 |

EXAMPLE 17

In order to evaluate the high temperature durability of the finished catalysts obtained in Examples 1 to 16 and Comparative Examples 1 to 6, following durability test was carried out and then the activities of the catalysts in the three-way reaction were examined.

A commercial electronically controlled engine (8-cylinder, 4400 cc) was operated cyclically with one cycle consisting of 60 second normal operation (rotating speed 3000 rpm) and 7 second decelerated operation (the minimum rotating speed 1800 rpm; during deceleration, the fuel was cut and the engine was exposed to a large excess of an oxygen atmosphere). At an inlet temperature of 810° C. and an SV of 350,000 hr$^{-1}$, each of the catalysts filled in a multiconverter set in the engine was aged for 50 hours.

To examine the activity of the catalyst in the three-way reaction, the conversions of CO, HC and NO of an exhaust gas from a 4-cylinder 1800 cc engine at A/F ratios varying from 14.1 to 15.1 at intervals of 0.1 in accordance with the A/F perturbation method. In the measurement of each of these conversions, the A/F ratio was oscillated by ±0.5 with a cycle of 1 second. The inlet temperature was 400° C., and the SV was 90,000 hr$^{-1}$.

Using the measured conversion values, three-way characteristic curves were drawn within coordinates in which the A/F ratio was taken on the abscissa and the conversions, on the ordinate. A conversion corresponding to the crossing point (to be referred to as the crossover point) between the CO conversion curve and the NO conversion curve, an HC conversion at an A/F ratio corresponding to the crossover point, and the range of A/F ratio in which both the CO conversion and the NO conversion were at least 80% (to be referred to as the 80% window width) were determined from these curves.

The results are shown in Table 5. It is seen from Table 5 that the catalysts of the invention show a higher conversion at the crossover point and a larger 80% window width than the catalysts obtained in the Comparative Examples, and therefore have higher high-temperature durability.

TABLE 5

| Example (Ex.) or Comparative Example CEx.) | Crossover point | | | 80% window width |
|---|---|---|---|---|
| | A/F ratio | Conversion (%) | HC conversion (%) | |
| Ex. 1 | 14.56 | 89 | 96 | 0.19 |
| Ex. 2 | 14.55 | 88 | 96 | 0.17 |
| Ex. 3 | 14.55 | 91 | 94 | 0.20 |
| Ex. 4 | 14.54 | 85 | 91 | 0.14 |
| Ex. 5 | 14.53 | 89 | 94 | 0.18 |
| Ex. 6 | 14.54 | 88 | 93 | 0.17 |
| Ex. 7 | 14.54 | 87 | 93 | 0.15 |
| Ex. 8 | 14.55 | 86 | 90 | 0.14 |
| Ex. 9 | 14.54 | 88 | 95 | 0.19 |
| Ex. 10 | 14.56 | 90 | 96 | 0.20 |
| Ex. 11 | 14.56 | 87 | 95 | 0.18 |
| Ex. 12 | 14.55 | 88 | 96 | 0.19 |
| Ex. 13 | 14.55 | 87 | 93 | 0.17 |
| Ex. 14 | 14.54 | 88 | 94 | 0.18 |
| Ex. 15 | 14.55 | 90 | 94 | 0.20 |
| Ex. 16 | 14.55 | 87 | 95 | 0.17 |
| CEx. 1 | 14.55 | 70 | 93 | none |
| CEx. 2 | 14.54 | 75 | 94 | " |
| CEx. 3 | 14.56 | 71 | 90 | " |
| CEx. 4 | 14.50 | 66 | 89 | " |
| CEx. 5 | 14.54 | 76 | 92 | " |
| CEx. 6 | 14.56 | 71 | 91 | " |

What is claimed is:

1. A process for producing a high-temperature resistant honeycomb catalyst for the simultaneous conversion of hydrocarbons, carbon monoxide and nitrogen oxides in an exhaust gas, which comprises admixing cerium, zirconium, at least one metal selected from the group consisting of iron and nickel, at least one metal selected from the group consisting of platinum, palladium and rhodium, and optionally at least one metal selected from the group consisting of neodymium, lanthanum and praseodymium, each in the form of an aqueous solution or dispersion of a soluble or easily water-dispersible compound of the metal, with active alumina, drying the mixture, calcining it, dispersing the resulting catalyst composition in an aqueous medium, and depositing the dispersion on a monolithic honeycomb carrier.

2. The process of claim 1 wherein per liter of the catalyst, there are deposited 5 to 30 g of cerium as $CeO_2$, 1 to 8 g of zirconium as $ZrO_2$, 0 to 10 g of iron as $Fe_2O_3$, 0 to 10 g of nickel as NiO, the total amount of $Fe_2O_3$ and NiO being from 0.5 to 15 g, 0 to 10 g of neodymium as $Nd_2O_3$, 0 to 10 g of lanthanum as $La_2O_3$, 0 to 10 g of praseodymium as $Pr_6O_{11}$, 0.01 to 10 g of at least one metal selected from platinum, palladium and rhodium as metal, and 50 to 200 g of active alumina as $Al_2O_3$.

3. The process of claim 2 wherein $CeO_2$ is deposited in a larger amount than the total amount of $ZrO_2$, $Fe_2O_3$ and NiO.

* * * * *